Nov. 16, 1971  W. C. KALLAS  3,619,908

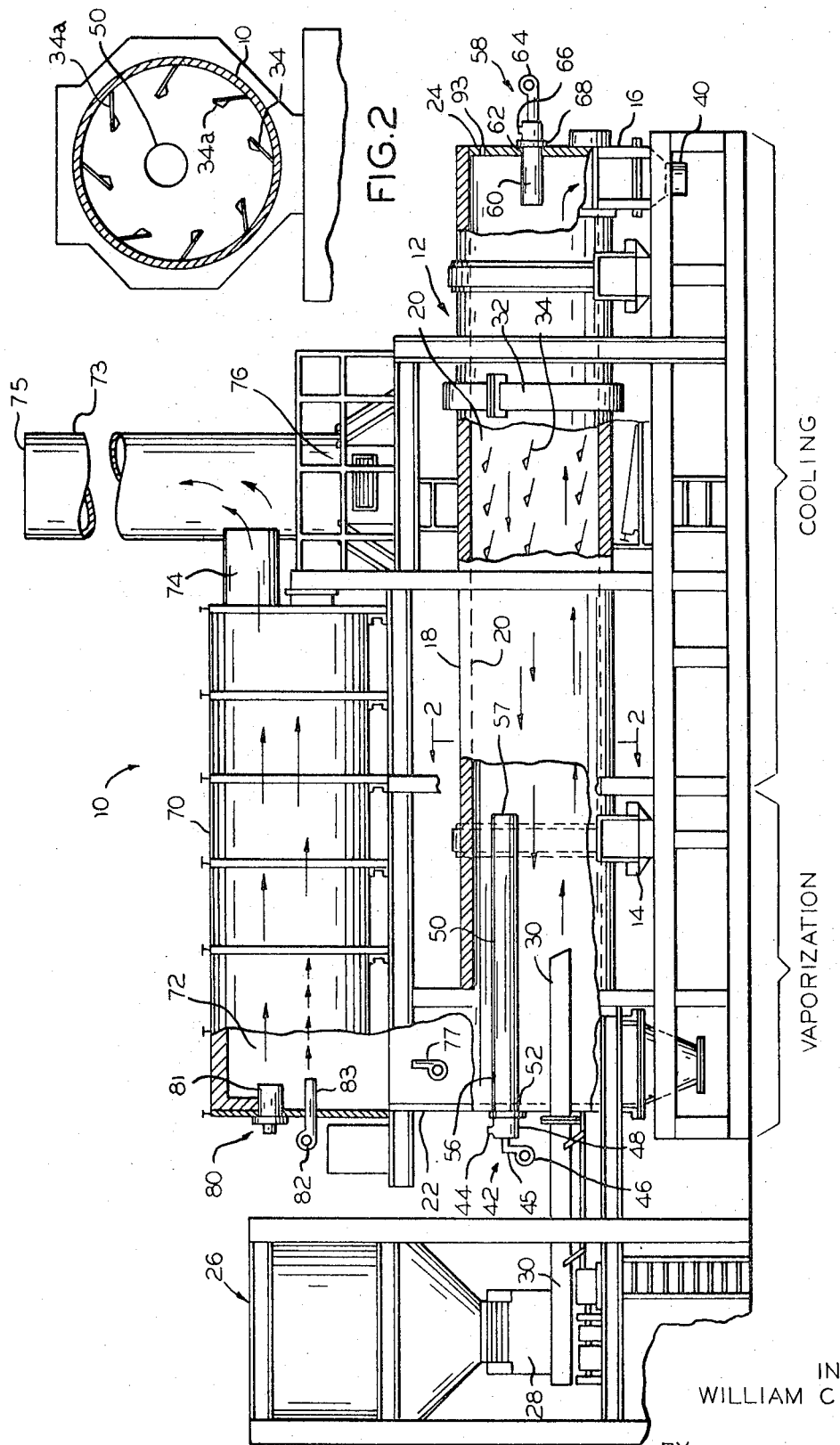
INVENTOR
WILLIAM C. KALLAS

DEVICE FOR CLEANING AND DRYING METAL CHIPS

Filed April 3, 1970  2 Sheets-Sheet 2

INVENTOR
WILLIAM C. KALLAS

BY Mann, Brown McWilliams & Bradway
ATTORNEYS

United States Patent Office 3,619,908
Patented Nov. 16, 1971

3,619,908
DEVICE FOR CLEANING AND DRYING METAL CHIPS
William C. Kallas, Park Ridge, Ill., assignor to Klefstad Engineering Co., Inc., Chicago, Ill.
Continuation-in-part of application Ser. No. 720,806, Apr. 12, 1968. This application Apr. 3, 1970, Ser. No. 25,384
Int. Cl. F26b 13/10
U.S. Cl. 34—56
8 Claims

ABSTRACT OF THE DISCLOSURE

A system for cleaning and drying wet and oily metal chips within a revolving drum by vaporization and combustion. The air flow moves in an opposed direction with respect to the movement of the metal chips. A main heat means is disposed adjacent the input feed for the chips to generate heat from inside the drum to the outer walls thereof. The heat means includes means for restricting direct impingement of flame onto the oily chips. The system includes various automatic control means to control drum temperature, feed rate, air flow and afterburner temperature in a safe, efficient and economical manner.

BACKGROUND OF THE INVENTION

This invention relates generally to a system for cleaning and drying wet and oily metal chips, and is directed to improvements in heating and heat control facilities in a vaporizing drum as well as improved conveying facilities.

This application has certain disclosures of afterburner structure, temperature regulation and counter air flow controls for vaporizing drums found in my previous application, Ser. No. 720,806, filed Apr. 12, 1968, now abandoned, and in copending application Ser. No. 44,265, filed June 8, 1970, and includes improvements in certain features of those applications.

It is desirable for economic reasons to salvage the metal chips or scrap materials accumulated from milling, boring, drilling and other metal forming operations. In such operations, lubricating and cooling oils are used which adhere to the metal shavings or chips and are extremely difficult to thoroughly remove. Various systems have been devised for removing these adhering oils from the chips. For example, in the past, scrap materials were fed into a drum and conveyed from an entry point to an exit point as the drum was rotated. Heaters having continually burning open flames were positioned inside the drum at the scrap input end. These open and exposed flames impinging upon the oily chips often caused uncontrollable burning and combustion. Frequently, the temperature inside the drum increased to such a high level that it became necessary to immediately reduce and sometimes even completely halt the input feed of metal chips into the drum in order to prevent the chips from melting and oxidizing.

A system recently in use controlled combustion by providing a main heater chamber which encircled the inner shell of rotating drum. The heat for the chips was then transferred through the inner shell from the external main heater chamber. This system, however, required a relatively greater quantity of heat than prior systems in order to maintain the desired operating temperature. The invention herein, on the other hand, more efficiently heats the drum by discharging the heat from the inside of the drum to the outer walls thereof, and also includes means for controlling the cleaning process in a safe, efficient and economical manner.

SUMMARY OF THE INVENTION

The device for cleaning and drying metal chips of the subject invention comprises a rotating drum in which metal chips are transported from an input end to an output end, in opposition to the flow path of the input air and exhaust gases. A main air furnace comprising a heat discharge tube having an open end within the drum for discharging heated air is at the input end of the drum. A pilot flame aperture is formed in the upper side of the tube. The heat discharge tube restricts direct impingement of flames on the chips which remain on the bottom of the drum as it rotates. Preferably the tube is formed so that a gas burner and air supply create a flame within the tube so as to discharge heated air through the end of the tube with little or no visible flame projecting beyond the open end of the tube.

The tube functions to control the heat discharge into the drum. If substantial heat is required, the burner is turned to a high fire setting. If, however, only a small flame is desired to serve as a pilot flame, primarily for burning out and preventing accumulation of combustible gases, the burner gas supply is sufficiently decreased so that only the pilot is utilized.

The invention further includes a preheater burner positioned at the discharge end of the drum and functioning primarily to heat the drum prior to the initial start of the cleaning process, thereby eliminating cold sections in the drum when the chips are first being transported through the drum. The preheater may, if desired, be turned off after initial heating in order that the metal chips may cool as they are transported from the input end to the discharge end. In some conditions, particularly for chips containing substantial water, it may be desirable to use the preheat furnace simultaneously with the main furnace, in which case it would then function as an auxiliary furnace.

The invention further includes a rotating heated drum which is arranged with conveying facilities and heating facilities so that the input end of the drum becomes a vaporization zone for fluids while the discharge end of the drum operates at a cooler temperature. The conveying facilities in the drum are arranged so that chips are tumbled within the drum and yet have a substantially uniform time of exposure to heat within the drum, even at various feed rates of chips. The invention also includes control means for the drum and the afterburner for exhaust gases which enables safe, efficient and economical operating temperatures while minimizing the presence of explosive mixtures within the apparatus.

Accordingly, it is a primary object of the invention to provide a device for cleaning and drying metal chips including means to prevent uncontrollable combustion of oils and gases inside the drum.

Another object is to control the heat inside the drum so that the chip discharge end is the coolest section of the drum, whereby the chips after being treated, are relatively cool upon discharge. The chips are thus ready for further processing and handling.

Another object is to provide a main heat furnace having an elongated heat discharge tube extending inside the drum, so that the heat discharge from the tube moves from inside the drum toward the outer walls thereof.

Another object is to restrict flames being emitted from the main heat furnace and thereby restrict direct impingement of the flames with the oily chips.

Another object of the invention is to provide conveying facilities in a drum in such a fashion that chips are tumbled within the drum for exposure of all surfaces of the chips to the heat within the drum, while all of the chips ar exposed to the heat within the drum for a substantially constant period of time at various feed rates of chips into the drum.

Still another object of the invention is to provide control means for a heated drum in such a fashion that, while some combustion of vapors may occur within the drum, combustion at the discharge end of the drum is substantially avoided to thereby enable the discharge end of the drum to operate at distinctly lower temperatures than other spaces within the drum.

A further object of the invention is to arrange apparatus for removing oil and water residues from metal chips in a safe, practical, and economical manner.

Still another object is to provide flame control means to prevent uncontrollable combustion of the oily chips.

Still another object is to provide heat control means to prevent uncontrollable combustion of the oily chips.

These and other objects and advantages will be apparent from the following description, specification, claims and illustrations.

BRIEF DESCRIPTION OF THE DRAWINGS

Referring to the drawing in which the same characters of reference are employed to indicate corresponding or similar parts throughout the several figures of the drawings:

FIG. 1 is a side elevational view of a system for cleaning oily metal chips, embodying the principles of the invention;

FIG. 2 is a sectional view taken on the plane of the line 2—2 in FIG. 1, viewed in the direction indicated, and showing the main furnace and the flights and lifters for conveying the metal chips through the drum;

DESCRIPTION OF THE PREFERRED EMBODIMENT

Figure 3:
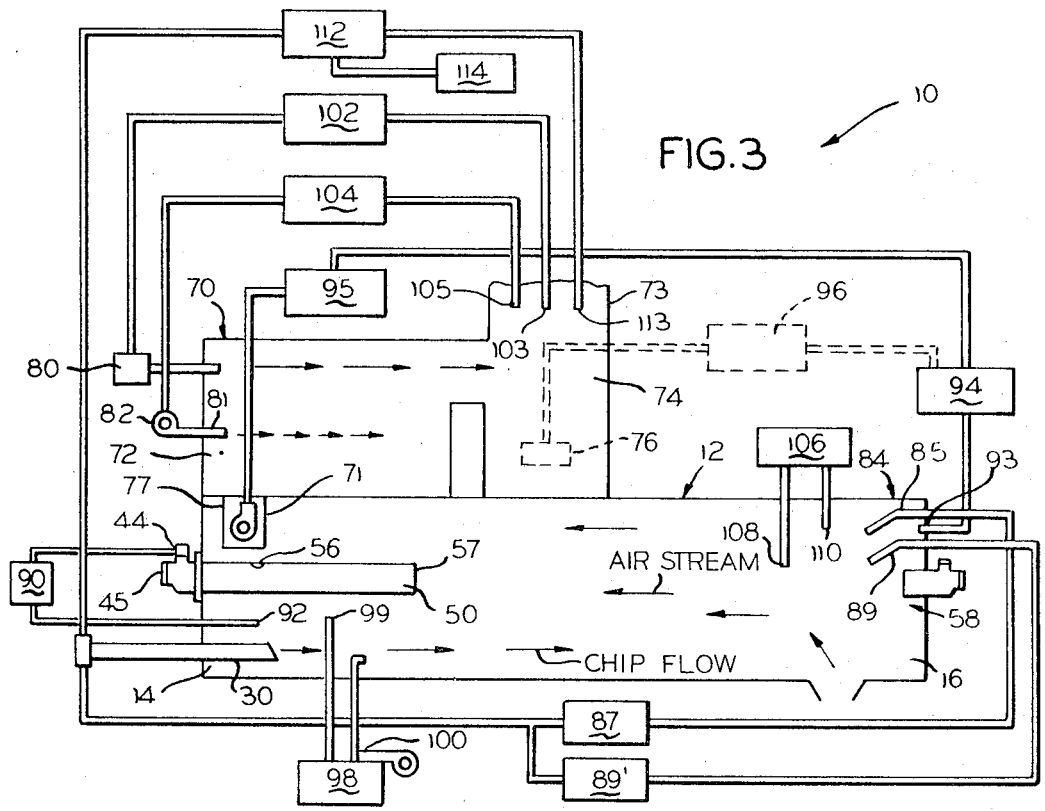
FIG. 3 is a block diagram illustrating system operation.

Referring now to FIG. 1 of the drawing, the reference numeral 10 indicates generally a system embodying the principles of the invention for cleaning and drying metal chips. The system 10 comprises an elongated cylindrical rotating drum 12 having an input feed 14 for receiving wet and oily metal chips and a discharge end 16 for discharging the treated metal chips after the moisture and oils have been removed by evaporization, burning and/or vaporization.

The drum 12 comprises an outer cylindrical shell 18 spaced outwardly from the outer surface of an inner cylindrical shell 20. A front end wall 22 and a rear end wall 24 are positioned close to the open ends of the shells 18 and 20. These end walls are not secured to the shells and are positioned sufficiently close to the ends of the shells so as to substantially restrict air flow through the open ends of the shells without making the shells airtight.

The oily metal chips are initially deposited in a turning crusher (not shown) where they are crushed into small and more uniform pieces. The crushed chips are then elevated into a surge hopper 26 where they are withdrawn at a controlled rate with an apron feeder 28. The chips are then conveyed into the inner shell 20 of the rotating drum by an oscillating conveyor 30 which extends through the front end wall.

Conveying flights are arranged within the drum so as to tumble chips within the drum as the drum is being rotated. Suitable means (not shown) are provided for rotating the drum. The inlet end of the drum is provided with two spirally formed flights 10a and 10b of plate stock which are fixed to the inner surface of the drum. These flights extend from the extreme input end of the drum for a short distance inwardly toward the discharge end of the drum. These flights extend radially toward the center of the drum. In a six-foot diameter drum, for example, these flights may have a radial dimension of approximately one foot. These flights serve to positively displace chips deposited at the extreme input end toward conveying flights 34 which are in the form of plates arranged in rows within the drum. As will be appreciated from FIG. 2, eight rows of the flights 34 may be utilized with the rows spaced equally from one another around the inner circumference of the drum. The number of rows used may vary with the size of the drum. The rows of flights extend from the flights 10a and 10b to the extreme discharge end of the drum. Each of the flights 34 is in the form of a plate which is disposed at an angle with respect to the axis of the drum, and having one edge fixed to the wall of the drum. Each flight is also at an angle to a tangent to the drum at the point that the flight is fixed to the drum. The trailing edge of each flight 34 is positioned at an angle such that it is ahead of the leading edge in the direction of rotation of the drum. Therefore, when the drum 10 is rotated, the inclination of the flights will pick up chips deposited by the conveyor 30 and move them a partial revolution around the drum as the drum rotates until they fall off the flights. Due to the inclination of the flights, the chips will fall forwardly toward the discharge end of the drum where they may be picked up by adjacent flights which are closer to the discharge end of the drum.

Figures 5, 6:
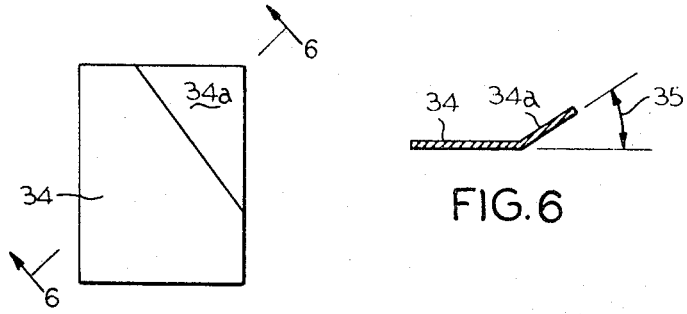
FIG. 5 is a plan view of a conveying flight.
FIG. 6 is a side view of a flight of the type illustrated in FIG. 5.

In accordance with the invention, each of the flights includes an angular portion (FIGS. 5 and 6) which is inclined to the remaining surfaces of each flight. These angular portions may be formed by bending up a corner portion 34a of each flight as represented in FIGS. 5 and 6. This corner portion is at the trailing edge of each flight and defines, in effect, a retaining ledge. It has been found that without the angular bent-up portion on the flights chips may accumulate on the flights to such an extent that, as the flights are rotated, some chips fall off the trailing edge and are thus not advanced through the machine at the same speed as other chips delivered to the drum at different volumetric feed rates. By providing flights as described, the flights act to tumble the chips within the drum to thereby expose all surfaces of the chips to the heat within the drum while at the same time assuring a substantially constant time of heat exposure for each chip within the drum. This particular arrangement of flights has been found to be particularly advantageous at varying feed rates.

In further accordance with the invention, the flights 34 in the drum adjacent to the heat tube 57 have a smaller angle to a tangent to the drum than do the flights from this area to the drum to the discharge end. The hottest portion of the drum is that area surrounding the heat tube 57. The space within the drum and around the heat tube may be defined as a vaporization zone wherein oils and other liquid residues on the chips are vaporized. The remainder of the drum from this vaporization zone to the discharge end may be termed a cooling zone wherein temperatures are cooler so that the chips may be discharged at relatively cool temperatures. The flights in the vaporization zone may make an included angle of approximately 40° with a tangent to the drum at the point that each flight is fixed to the drum, whereas the bent-up portions 34a of the flights 34 in the cooling zone may have a greater included angle with such a tangent on the order of 50°. The greater angle in the cooling zone causes chips to be retained on the flights for a greater arc of rotation of the drum than is the case of the vaporization zone and this is advantageous because the greater lifting action exposes chips in the cooling zone to a greater amount of air flow through the drum to enhance cooling thereof. The bent-up corner portions of the flights in the vaporization zone have a greater angle to the surfaces of their associated plates than the other bent-up portions of the flights in the cooling zone. For example, the bent-up portions in the vaporization zone may make an included angle of approximately 35° with the remainder of their plate whereas the bent-up portions in the cooling zone may make an included angle of approximately 15° with their plates.

Figure 4:
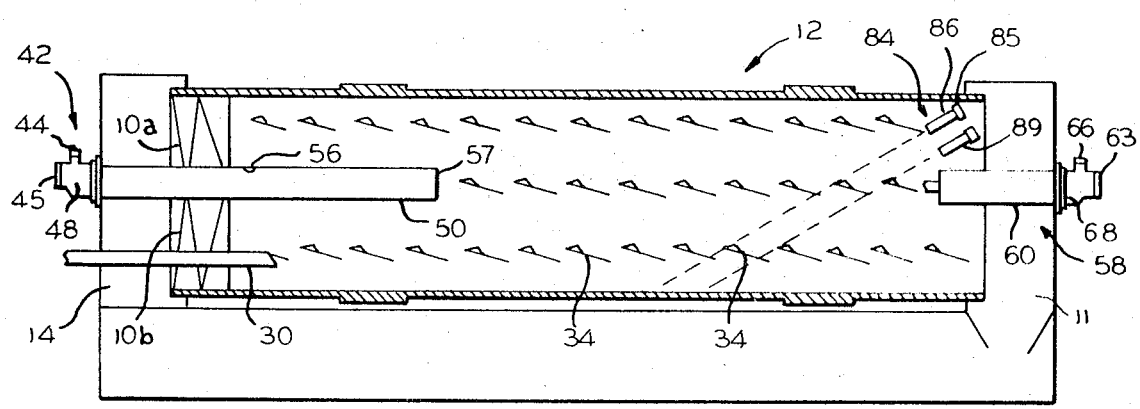
FIG. 4 illustrates the heating means for the drum and the flame sensors.

An output chute 40 is located at the discharge end 16 of the drum 12. The treated metal chips are discharged into the output chute 40 and are transferred from the chute into a receiving bin or conveyor means (not shown). Air sucked up through the chute 40 may provide an air source for system air flow. System air and exhaust gas flow is illustrated in FIG. 1 by long arrow lines, and is in opposition to the metal chip flow. The exhaust gases and products of combustion are pulled out of the system by a stack control which will be described hereinafter. Exhaust gases and products of combustion move opposite to the direction of chip movement, with or without the addition of outside air at the discharge end of the drum. Addition of air provides support for combustion of oil vapors. A main air furnace, generally designated at 42 (FIGS. 1, 2 and 4) provides a main heat input adjacent the chip input feed end 14 of the drum 12. Air furnace 42 comprises a gas input 44 and an air input 45 from a blower 46 which are connected into a conduit 48, which in turn directs a flame into a tube 50.

Tube 50 (FIGS. 1 and 4) extends inside the inner shell 20 of drum 12 and communicates with the conduit 48 at an opening 52 formed in the front end wall 22 of the drum 12. Tube 50 is located above the longitudinal axis of the drum.

Burner tube 50 includes a pilot aperture 56 positioned close to end wall 22 and an opening 57 disposed at the innermost end of tube 50 inside the drum. The heated air is ejected from the opening 57 for heating the interior portions of the drum 12. Tube 50 is closed, except for the pilot aperture and the opposite end openings for the burner and for directing heat to the drum interior. Since the drum rotates, the drum inner shell and flights are uniformly heated. In this manner any flame which may be emitted from open end 57 of the tube has relatively little contact with the chips which mainly are below the heater tube. The chips are heated upon contact with the inner drum surface flights and from the heated atmosphere within the drum.

A preheat furnace or burner 58 (FIGS. 1 and 4) may be disposed at the discharge end 16 of the drum. Furnace 58 includes a heater tube 60 which extends inside inner shell 20.

The preheat furnace 58 comprises an air input 63 from a blower 64 and a gas input 66. The preheat furnace 58 is used for preheating the drum. After the drum is sufficiently heated furnace 58 may, if desired, be turned "off." The furnace 58 may be left on, depending upon the exact temperature desired at the cooler, discharge end of the drum. This furnace 58 minimizes any cold sections in the drum.

An afterburner chamber 70 is secured above drum 12. An opening 71 formed on the front section 72 of the afterburner chamber 70 provides an entranceway for the passage of smoke, vaporized liquids and fumes from the input end 14 of the drum 12. The afterburner chamber 70 may be located in a position other than shown in FIG. 1, provided that the input to the afterburner is only a short distance from the input end 14 of the drum.

The discharge stack 73 extends upwardly from the end of the afterburner chamber 70 remote from the inlet opening 71. The outermost end 75 of the stack opens to the atmosphere. Stack 73 is connected to and extends upwardly from breeching 74 which connects the stack to the afterburner 70 for communication therewith. A damper 76 is positioned in the wall of stack 73 or in the wall of the breeching 74 so as to admit exterior air, in a controlled fashion, through an opening in the breeching to the stack. The stack 73 provides a natural draft for the flow of relatively hot, light air from the afterburner upwardly through the stack. Damper 76 controls the air draft by admitting cool air to this flow of exhaust gases.

An increase in the effective opening through the breeching under control of damper 76 permits more cooling air to enter the exhaust gases and the air draft thus decreases while increasing the absolute air pressure. A decrease in the damper opening under control of damper 76 increases the air draft and reduces the absolute air pressure. Thus, damper 76 may function to control the draft and the flow through the drum and afterburner.

An exhaust fan 77 may be positioned either in the discharge stack 73 or adjacent the opening 71 leading into the afterburner chamber. Such an exhaust fan may be used either with or without the damper 76 for control of the draft. If used with the damper 76, the exhaust fan 77 helps to create a draft through the drum 12, afterburner chamber 70, and stack for pulling smoke, fumes, vaporized liquids and air out of the drum, and through the afterburner chamber for discharge through the stack. A speed control means is used with the exhaust fan 77 so that by increasing the capacity (by increase in speed) of exhaust fan 77 the air draft is increased. Conversely, decreasing the capacity of the exhaust fan, decreases the air draft.

Since the inlet to the afterburner is positioned adjacent the input feed end 14 of the drum 12, the greatest air draft is at the input feed end 14. At the input feed end 14 of the drum, the chips are wet and more cohesively associated with one another than any other location in the drum, and hence at the input feed end there is the least tendency for the chips to be lifted into the air stream and discharged with the exhaust gases.

A secondary air furnace or burner 80 (FIGS. 1 and 3) ejects heated air through conduit 81 into the front 72 (or inlet end) of the afterburner chamber 70. A blower means 82 (FIGS. 1 and 3) delivers secondary air through an air inlet 83 into the afterburner chamber 70. The combining of the heated air from the secondary furnace 80 with the oxygen from the secondary air, causes combustion of the oily fumes and of the smoke and impurities in the main air stream flowing from the drum 12 into the afterburner 80 via opening 71. Thus, the impurities remaining after the burning and vaporization of the oils on the metal chips inside the drum are further burned and disintegrated in the afterburner chamber 70. The heated air from the secondary air furnace 80 is illustrated by broken lines, and the secondary air from inlet 83 is illustrated by short arrow lines.

Preferably, blower 82 delivers a quantity of secondary air in excess of that necessary to support combustion and the temperature in the afterburner is maintained slightly above that which is necessary to support combustion.

A first flame sensor means 84 (FIGS. 3 and 4) is disposed near the discharge end 16 of the drum for detecting the presence of flame at a predetermined distance along the length of the drum. The flame senser means 84 comprises a light senser 85 for infrared radiation which forms the greater part of gas and oil flames.

A hollow cylinder member 86 encircles the photocell senser 85 and extends outwardly therefrom and is directed toward the interior of the drum. The width and length of cylinder 86 determines the target area for flame sensing. Increasing the length and/or decreasing the width of the cylinder 86 decreases the target area, and decreasing the length and/or increasing the width of the cylinder 86 increases the target area.

The flame senser means 84 includes a signal converter means 87, which in turn is connected to the chip input conveyor 30. Flame detected by light senser 85 causes a drive signal to be generated at the output of the converter means 87, the effect of which slows down the movement of conveyor 30.

The detection of flame within the target area by the flame senser means 84 causes the chip input rate to decrease. When flame is no longer detected the chip input rate returns back to the preset normal rate.

A second flame senser means 89 (FIG. 4), which is similar to flame senser 84, may be used to detect flame at a point closer to the chip discharge end 16 than the first flame senser means 84, and, upon activation, causes the chip input to turn off completely. The senser means 84 would be activated first to cause a slowdown of the input chip feed and the second senser means 89 would only be activated if flames continued to travel toward the chip discharge end. The second senser thus functions as an additional safeguard for preventing uncontrollable burning within the drum. If only one senser is desired, it is positioned as senser 89 and is effective to turn off the feed when a flame is sensed.

The second senser means 89 also comprises a signal converter means 89' connected to the motor drive for conveyor 30. The signal corresponding to the detection of flame by the second senser means causes the converter means 89' to generate a drive signal at its output. The drive signal causes the conveyor 30 to completely stop. When flame is no longer detected by flame senser means 89, the turn-off drive signal is removed from the motor drive of the conveyor and the conveyor begins to feed again.

It should be understood that the showing of conveyor 30 is intended to be a diagrammatic showing of variable rate conveying apparatus. In practice, the signal converters 87 and 89' may control the feed rate of a first conveyor which is outside the drum and the first conveyor may be arranged to deliver chips to a second conveyor which extends within the drum.

A main heat control means 90 (FIG. 3) is connected to the gas input 44 of the main air furnace 42. The heat control means 90 comprises a heat sensor 92 which extends inside the front of the drum for sensing temperature within the drum. The heat control means 90 increases or decreases the gas flow into conduit 68 in response respectively to a decrease or increase in the temperature at the input end 14 of the drum from a predetermined set level. This in turn varies the heat discharged from the opening 57 of conduit 50.

An air port 93 (FIGS. 1 and 3) is formed in the rear end wall 24 of the drum 12. Port 93 communicates with an air sensing means 94 for the purpose of sampling air velocity and/or pressure. The air sensing means 94 may comprise a balancing apparatus (not shown) which varies with the velocity or increment of velocity of the air passing through the air port 93. The balancing apparatus is set to null or balance at a predetermined velocity of air passing through port 93 which corresponds to the desired air velocity at the output end 16 of the drum 12. The balancing apparatus may include a wind vane device whereby the amount of deflection is proportional to air velocity.

The air senser means 94 is connected to a fan control means 95 (FIG. 3), which in turn is connected to the the exhaust fan 77. The cooperation of the fan control means 95 with the air senser means 94 causes the capacity of the exhaust fan 77 to vary with changes in the velocity of the air flowing into system 10 for maintaining the air velocity of the main air stream relatively constant at a predetermined set velocity. The change in capacity of the fan is brought about by a speed control for the fan. Other means may be used to control the fan capicity. Thus, a decrease in the air velocity and/or pressure through port 93 automatically causes the capacity of the exhaust fan 77 to increase, thereby increasing the air draft in the system. Conversely, detecting an increase of air velocity through port 93 causes the exhaust fan 77 to decrease in speed, thereby decreasing the air draft in the system.

The air senser means 94 is also connected to a stack control means 96 (FIG. 3) shown in phantom, which in turn is mechanically linked to the stack damper 76. Thus, if the velocity through air port 93 increases above a predetermined set amount, the stack control means 96, upon signal from air senser means 94, would increase the damper 76 opening, thereby decreasing the system air draft. Conversely, if the velocity through port 93 decreases below a predetermined set amount, the opening of damper 76 would be decreased. Instead of using the air velocity senser to control both the damper opening and exhaust fan, it may be used to control either for purposes of maintaining the draft at a predetermined set level.

A temperature controlled water injection means 98 (FIG. 3) ejects water into the drum if the interior drum space temperature rises beyond a predetermined level. Water injection means 98 comprises a heat senser 99 located at the input end of the drum which is connected to a water valve means 100. When the temperature at the input end of the drum rises beyond a predetermined level, the water valve means 100 is turned "on" from an "off" position, and water is ejected into the drum. The water flow from the injection means 98 is set to gradually increase flow with increases in temperature from a predetermined set level and the water gradually decreases in flow with decreases in temperature until reaching the water "off" position. Thus, the amount of water injected into system 10 is proportional to the heat intensity inside the drum.

An afterburner heat control means 102 (FIG. 3) is connected to the secondary air furnace 80. Heat control means 102 senses the temperature of the exhaust gases in the stack 73 with a senser 103.

A secondary air control means 104 (FIG. 3) may also be used for sensing the temperature in the stack 73. Air control means 104 as shown is connected to the secondary air blower means 82 and senses stack temperature with senser 105.

A decrease in stack temperature below a first predetermined level causes the air control means 104 to turn off the secondary air input from blower means 82. An increase in stack temperature above a second predetermined level causes the heat control means 102 to turn off the secondary heat input from furnace 80. Between the first and second predetermined temperature levels, the secondary heat input and secondary air input are "on." The combined action of the heat control means 102 and air control means 104 maintains the temperature of the exhaust gases in the stack 73 at substantially a constant temperature range, and also minimizes the secondary heat input into the chamber 72 which is required to further burn the oily fumes and smoke before their discharge from stack 73.

Preferably blower 82 and furnace 80 are controlled so that an excess quantity of secondary air is delivered to the afterburner for blending with gases in the afterburner. In practice, combustion of the exhaust gases may cause a temperature in the afterburner in excess of that required for burning of the exhaust gases with little or no heat input from burner 80. Excess secondary air is then used to cool the afterburner chamber to an amount just above the ignition temperature of the exhaust products. This in turn requires less insulation and thus less expense in fabricating the afterburner.

Alternatively, the heat control means 102 and the air control means 104 may act simultaneously. Thus, a decrease in stack temperature from a predetermined operating temperature level is sensed by the heat control means 102 and the air control means 104, causing respectively an increase in secondary heat input from the secondary air furnace 80 and a decrease of secondary air input from blower means 82. Conversely, an increase in stack temperature from the predetermined temperature level is sensed by the heat control means 102 and the air control means 104, causing respectively a decrease of secondary heat input and an increase in secondary air input.

An output water injection means 106 (FIG. 3) may be located at the output end 16. The water injection means 106 comprises a heat senser 108 and a water injection nozzle 110. The output water means 106 is triggered "on" to inject water into the output end 16 when the heat in the drum 12 at the output end or the intensity of the flames reaches or exceeds a predetermined temperature level. The water flow from the injection nozzle 110 may be set to gradually increase with increases in temperature from said predetermined level, and to gradually decrease with decreases in temperature until reaching a water "off" position when the temperature falls below a predetermined level. Thus, the amount of water injected into the drum is proportional to the heat intensity at the output end 16.

A speed control means 112 (FIG. 3) is connected to the drive of the conveyor means 30. The speed control means 112 includes a heat senser 113 positioned inside the stack 73. Originally, the feed rate of the chips into the drum 12 is preset to an optimum maximum rate for the system 10. When the stack temperature substantially increases above a predetermined set level, due primarily to insufficient secondary air to reduce the afterburner and stack temperature to that desired, the speed control means 112 causes the input feed rate to decrease. The secondary air may be insufficient even though the secondary air control means 104 may be driving blower 83 at its maximum air injection rate; and in this condition control of the stack temperature and the afterburner temperature is accomplished by the speed control means 112 decreasing chip input, which in turn reduces the amount of exhaust products available for combustion.

The speed control means 112 may also include a temperature switch which closes when the temperature in the stack exceeds a predetermined level and reopens when the temperature level falls below the predetermined temperature level. The closing of the switch causes the speed of the conveyor 30 to be decreased to a predetermined first speed rate. A timer 114 (FIG. 3) is connected to the speed senser means 112 and is triggered "on" for a preset time interval. If after the time interval the switch is still closed, the speed of the conveyor 30 is caused to decrease to a second speed rate, which is slower than the first rate. The timer 114 is again triggered "on" for another time interval. If at the end of this time interval the switch is still closed, the conveyor is automatically caused to decrease to another preset speed which is slower than the second speed. These speed decreasing operations are continued until the switch opens. If the heat has built up to a relatively high temperature, speed control means 112 may even cause conveyor 30 to stop entirely, until the temperature again falls below a predetermined level. This condition may occur if the chips contains substantial quantities of oil.

When the switch opens, the inverse sequence of operations occurs. The speed of conveyor means 30 is increased and the timer 114 is triggered "on." If, at the end of the time interval, the switch is still open, the speed of the conveyor 30 is advanced to the next preset conveyor speed. However, if the switch closes again, the conveyor speed is decreased to the next slower speed. The variations in the rate of input feed continues until the temperature in stack 73 stabilizes below the predetermined temperature level and in such stabilized condition of the system the conveyor returns to its normal or original chip feed speed.

It should be understood that variable speed conveyors and signal responsive controls therefor, flame sensing elements and signal generating devices cooperative therewith, pressure and velocity sensing devices for controlling temperature and/or for exhaust fans and dampers, and temperature sensing controls with signal generators and converters for modulating burners and control valves are individually known and for this reason they are not disclosed in detail herein except for their combine relationship in controlling the chip cleaning process and apparatus as described.

In operation, the conveyor 30 feeds chip to the inlet end of the drum at a rate established by the requirements in the particular system. Conveying flights within the drum are so arranged as to lift the chips and cause tumbling thereof as they are advanced through the drum through rotation of the drum. The tumbling action assures substantially uniform heating of all of the surfaces of the chips and the particular conveying flight arrangement in the drum assures that the time of exposure in the drum is substantially the same even at various rates of feed of chips into the drum.

The hottest part of the drum exists at and near the inlet end of the drum around the heat tube and the temperature of the drum in this area is maintained above the vaporization temperature of the various liquids carried by the chips. Some combustion of the liquid residues occur in the vaporization zone and some may occur at regions closer to the discharge end of the drum. In the event that combustion occurs close to the discharge end, the flame sensing elements are effective to reduce heat in the drum by reducing the rate of feed of chips into the drum which in turn reduces the amount of combustible liquids introduced into the drum by way of the chips and, hence, reduces the tendency of fire to propagate toward the discharge end of the drum.

The temperature required to vaporize the liquids within the drum is controlled both by control of the intensity of the burner flame within tube 50 and by the water quench. In practice, the drum temperature in the vaporization zone is such as to cause vaporization of substantially all liquids carried by the chips without producing uncontrolled burning of the vaporized liquids within the drum. The air flow within the drum, which moves counter to the direction of chip flow, is set at an amount such as to prevent explosion of the mixture of vapors within the drum. Preferably the air flow is such as to provide a reducing atmosphere in which the gases are too rich to explode. This air flow is regulated under control of damper 76 and/or the exhaust fan.

The control of temperature within the drum and the draft within the drum is such that total combustion of the vaporized liquids does not occur within the drum. The combustion process is completed in the afterburner. The afterburner is arranged so that the temperature in the afterburner is sufficient to cause complete combustion of the exhaust gases without producing unnecessary higher temperature in the afterburner. A temperature on the order of that sufficient to produce combustion without undue excess temperatures is effected by admitting quantities of secondary air in excess of that necessary to support combustion. The excess secondary air exerts a cooling action within the afterburner and the temperature is thus maintained rather closely.

When the chips contain a substantial amount of combustible liquids, the burning of the exhaust gases within the afterburner usually is sufficient to maintain combustion within the afterburner and the afterburner furnace 80 is then used at a low fire position.

The system may also be advantageously used when relatively little combustible materials are carried by the chips and where the chips carry a large amount of water. In this event, the water is vaporized in the drum and driven off through the afterburner. Any combustible particles carried with the water are burned in the afterburner. In this event, combustible materials may also be incinerated partially or wholly within the drum.

I claim:

1. A machine for removing liquid materials from metal chips including an elongated hollow drum having an inlet end and a discharge end, means in said drum for conveying chips deposited in the inlet end of said drum toward said discharge end of said drum an elongated hollow heater tube having a closed cylindrical wall and an open inner end positioned within said drum at the inlet end portion of the drum and directed toward the discharge end of said drum, said tube being at an intermediate level in said drum, said heater tube including means for directing a flow of heated air through the open end of said tube to the interior of said drum, said directing means including a burner connected to the outer end of said tube, said burner having an air and fuel supply therefor, and afterburner means having an inlet opening communicating with the inlet end of said drum to cause a flow of gases and products of combustion from the discharge end of said drum and toward said inlet end of said drum to said afterburner, said heater tube extending toward said discharge end to deliver heated air from its open inner end to said drum at a location in said drum between said afterburner inlet and drum discharge end and intermediate the length of said drum.

2. The structure of claim 1 wherein said conveying means in said drum includes conveying flights on the interior wall of said drum and means for rotating said drum.

3. The structure of claim 1 wherein said heater tube includes a pilot flame aperture adjacent the input end of said drum.

4. The structure of claim 1 characterized by and including flame sensing means positioned near the discharge end of said drum for detecting the presence of a flame near said discharge end of said drum, and means operated by said sensing means in response to a flame sensed thereby for reducing the feed rate of conveying means for delivering chips to said drum.

5. The structure of claim 4 wherein said flame sensing means includes first and second flame sensing means, each located near the discharge end of said drum but with said first sensing means located nearer the inlet end of said drum than the second flame sensing means, said first flame sensing means being effective to reduce the feed rate of chips in response to detection of flame in said drum at one location and said second sensing means being effective to stop said feed rate in response to detection of flame between said location and the discharge end of said drum.

6. A machine for removing liquid materials from metal chips including an elongated hollow drum, said drum having an input end and a discharge end, means for heating the input end of said drum to thereby heat the interior of said drum to cause vaporization of liquids carried by metal chips deposited within said drum, means for conveying chips deposited within said drum from said input end toward said discharge end of said drum, means for feeding chips through said input end of said drum and into the interior of said drum, feed rate control means for said conveyor means, and flame sensing means positioned near the discharge end of said drum for detecting the presence of an open flame near the discharge end of said drum, and means responsive to said sensing means and connected to said feed rate control means for reducing the feed rate in response to the presence of an open flame near the discharge end of said drum.

7. The structure of claim 6 wherein said flame sensing means includes first and second flame sensing means, said first flame sensing means being disposed nearer the input end of said drum than said second flame sensing means, said responsive means including means operated by said first flame sensing means for actuating said feed rate control means to reduce the feed of chips to said drum, and means operative in response to detection of flame by said second flame sensing means to stop feed of chips to said drum.

8. The structure of claim 1 wherein said heater tube is positioned to define a vaporization section within said drum in the area of said drum around and adjacent to said heater tube, and a cooling section between said vaporization section and said discharge end, said drum including conveying flights on the interior wall thereof, said flights being defined by plates affixed to the interior wall of the drum and extending inwardly toward the center of the drum, said flights being arranged in rows along the length of the drum and being inclined with respect to the axis of said drum, so as to rotationally displace chips within said drum, each of said flights including bent portions at an angle with respect to the general plane of the associated flight to define a retaining ledge, the flights in said cooling section having bent portions at a greater angle with respect to the general plane of their flights than the angles defined by the bent portions of the flights in the vaporization section, to thereby provide a greater lifting action by the flights in said cooling section than the lifting action in said vaporization section.

References Cited

UNITED STATES PATENTS

| | | | |
|---|---|---|---|
| 2,104,040 | 1/1938 | Hurt | 263—33 X |
| 2,309,810 | 2/1943 | West | 263—33 X |
| 2,814,339 | 11/1957 | Aubert | 431—285 X |
| 2,852,418 | 9/1958 | MacDonald | 134—25 X |
| 2,925,821 | 2/1960 | MacDonald | 110—14 X |
| 2,977,255 | 3/1961 | Lowry | 134—25 X |
| 3,346,417 | 10/1967 | Ehrlich | 134—25 X |
| 3,407,511 | 10/1968 | Camm | 263—33 X |

CARROLL B. DORITY, Primary Examiner

U.S. Cl. X.R.

34—132, 135; 134—25; 263—33 R